(12) United States Patent
Suga et al.

(10) Patent No.: US 9,124,160 B2
(45) Date of Patent: Sep. 1, 2015

(54) DRIVE UNIT

(75) Inventors: Yuuji Suga, Kariya (JP); Hiroshi Imai, Toyohashi (JP)

(73) Assignee: DENSO CORPORATION, Kariya (JP)

(*) Notice: Subject to any disclaimer, the term of this patent is extended or adjusted under 35 U.S.C. 154(b) by 303 days.

(21) Appl. No.: 13/469,134

(22) Filed: May 11, 2012

(65) Prior Publication Data
US 2012/0286603 A1 Nov. 15, 2012

(30) Foreign Application Priority Data

May 11, 2011 (JP) .................................. 2011-106363

(51) Int. Cl.
*H02K 5/22* (2006.01)
*H02K 11/00* (2006.01)

(52) U.S. Cl.
CPC ............ *H02K 11/0073* (2013.01); *H02K 5/225* (2013.01)

(58) Field of Classification Search
CPC ........... H02K 3/50; H02K 3/522; H02K 5/22; H02K 5/225; H02K 11/0068; H02K 11/0073
USPC .......................................................... 310/71
See application file for complete search history.

(56) References Cited

U.S. PATENT DOCUMENTS

| | | | | |
|---|---|---|---|---|
| 5,500,563 A | * | 3/1996 | Kawaguchi et al. | 310/71 |
| 6,081,056 A | * | 6/2000 | Takagi et al. | 310/89 |
| 2003/0127921 A1 | | 7/2003 | Akutsu et al. | |
| 2008/0219867 A1 | | 9/2008 | Sakata | |

FOREIGN PATENT DOCUMENTS

| | | | | | |
|---|---|---|---|---|---|
| JP | 11356006 A | * | 12/1999 | ............... | H02K 5/22 |
| JP | 2010028925 A | * | 2/2010 | | |

OTHER PUBLICATIONS

Kanehara et al., JP2010028925 Machine Translation, Feb. 2010.*
U.S. Appl. No. 13/469,126 of Tomizawa et al, filed May 11, 2012.
U.S. Appl. No. 13/469,198 of Abe et al, filed May 11, 2012.
U.S. Appl. No. 13/469,207 of Miyachi et al, filed May 11, 2012.
Office Action (1 page) dated Apr. 22, 2014, issued in corresponding Japanese Application No. 2011-106363 and English translation (2 pages).
Office Action dated Dec. 31, 2014 in CN application No. 201210144254.1 (with translation).
Office Action (6 pages) dated Jul. 8, 2014, issued in corresponding Chinese Application No. 201210144254.1 and English translation (8 pages).

* cited by examiner

*Primary Examiner* — Quyen Leung
*Assistant Examiner* — Eric Johnson
(74) *Attorney, Agent, or Firm* — Nixon & Vanderhye P.C.

(57) ABSTRACT

A drive unit has a motor, a control unit, and a fastener. The motor is housed in a motor case, and includes a stator, a rotor, and a shaft. The stator has winding wires that are wound therein and are electrically coupled to motor wires. The rotor is disposed inside of the stator and the shaft is disposed in and coupled to the rotor, such that the rotor and shaft rotate, as one, within the stator. The control unit includes a semiconductor module with a switching element, a connection terminal that electrically couples the switching element with other devices, and a control unit case to house the semiconductor module. The fastener is disposed in the control unit case, such that the fastener couples the motor and the control unit, and electrically couples the motor wire and the connection terminal.

6 Claims, 11 Drawing Sheets

DRIVE UNIT

CROSS REFERENCE TO RELATED APPLICATION

This application is based on and claims the benefit of priority of Japanese Patent Application No. 2011-106363 filed on May 11, 2011, the disclosure of which is incorporated herein by reference.

TECHNICAL FIELD

The present disclosure generally relates to a drive unit which has a motor and a control unit for controlling the motor in one body.

BACKGROUND

Conventionally, an electric power steering device, in which the drive unit assists a steering operation of a driver, has the motor and its control unit housed in one body. Such steering device is described in Japanese Patent Laid-Open No. 2003-204654 (JP '654). The steering device of JP '654 has an electrical connection between the motor and the control unit enabled by fastening a bus bar extending from the control unit on a winding wire terminal in a motor case by using a screw. In such structure, the bus bar on the control unit side and the winding wire terminal on the motor side can be easily separated from each other to allow, for example, the replacement of one of the two parts when the parts are broken.

However, since the bus bar from the control unit and the winding wire of the motor are coupled inside of the motor case, the structure of the steering device of JP '654 may require the motor to have a larger size. Further, when the screw for fastening the bus bar on the winding wire terminal is removed, the drive unit has to be removed from a column shaft that is connected to a steering wheel. In other words, such structure does not allow an easy removal of the control unit without first removing the drive unit from the column shaft.

SUMMARY

In an aspect of the present disclosure, the drive unit includes a motor, a control unit disposed on one end of the motor, and a fastener. The motor is housed in a motor case, which serves as an outer shell of the motor, and has a stator on which winding wires are wound to present multiple phases. The winding wires are electrically coupled to motor wires, which extend parallel to a shaft of the motor. A rotor is disposed inside of the stator and the shaft is disposed and coupled to the rotor. Both the rotor and the shaft rotate within the stator as one (i.e. the rotor and the shaft are rotatable relative to the stator).

The control unit has a semiconductor module that includes a switching element for switching electricity supplied to the winding wires. The semiconductor module is housed in a control unit case. The switching element has a connection terminal that electrically couples the switching element with other devices. The fastener provides the connection between the motor and the control unit both mechanically and electrically. More practically, the electrical connection between the motor and the control unit is secured by the fastener between the motor wires of the motor and the connection terminals of the control unit.

As provided in the background, when the drive unit is attached to the column of the electric power steering device, the motor and the control unit are coupled by a fastener that is oriented from the column side to a motor side. In other words, the motor and the control unit may not be separated until after the drive unit is removed from the column shaft.

When the drive unit of the present disclosure is applied to the electric power steering device, the control unit is orientated on the other side of the column relative to the motor. In such structure, the fastener is used to secure the mechanical connection between the motor and the control unit, as well as to secure the electrical connection between the motor wires and the connection terminals. Further, without releasing the connection between the motor and the column, the motor and the control unit may be detached both mechanically and electrically. Furthermore, since the screws can be used repeatedly, the motor and the control unit are re-attached and are detached relatively easily without affecting other functions of the drive unit.

Further, the fastener is disposed in the control unit, which prevents an increase in the size of the drive unit.

In addition to the above, the fastener includes (i) a receptacle having (a) a base portion that is attached to an end of the motor wire and (b) a tight end portion that is coupled to the connection terminal, (ii) the screw member that couples the connection terminal and the tight end portion, and (iii) a receptacle holder that holds the receptacle. The receptacle is coupled by the screw member on the connection terminal. When the receptacle is coupled on the connection terminal, the screw member is attached on the tight end portion of the receptacle, which is a control unit side end of the receptacle. The other side of the motor relative to the control unit has the column attached thereon. In such manner, the screw member is disposed on the control unit side of the motor, thereby allowing an easy access for the mechanic or the like, for the ease of assembly and disassembly of the control unit to/from the motor by using the screw member.

The receptacle holder holds the receptacle that is attached to an end of the motor wire. The receptacle holder fixedly defines a relative position of the receptacle against the motor by holding the receptacle. In other words, the receptacle holder prevents the positional change of the receptacle when the motor and the control unit are reattached or detached.

In addition to the above, the connection terminal is formed on a board that supports the switching element. The connection terminal directly formed on the board contributes to a reduction of the number of parts for electrically coupling the motor to the control unit.

In addition to the above, the receptacle holder is formed along an axial direction of the receptacle. In a course of attachment or detachment of the motor and the control unit, the receptacle receives a pulling force or a compression force. In view of such force, the strength of the receptacle in an axial direction of the receptacle is increased by forming the receptacle holder such that its axis is aligned with an axis of the motor.

In addition to the above, the receptacle holder is made with an insulation material. By using the insulation material for the receptacle holder, the insulation of the receptacle is secured.

In addition to the above, the screw member couples the tight end portion of the receptacle from the control unit side to the motor side. The screw member for coupling the connection terminal on the receptacle is attached on the tight end portion with its orientation set from the control unit side to the motor side. The control unit of the drive unit may be configured to be attached on one axial end of the motor. In such structure, an assembly screw member for an assembly of the control unit on the motor is oriented from the control unit side to the motor side. In other words, the assembly screw member for attaching the control unit on the motor and the screw member for fastening the receptacle on the connection terminal are attached on the drive unit in the same direction.

BRIEF DESCRIPTION OF THE DRAWINGS

Other objects, features and advantages of the present invention will become more apparent from the following detailed description made with reference to the accompanying drawings, in which.

DETAILED DESCRIPTION

Figure 1:
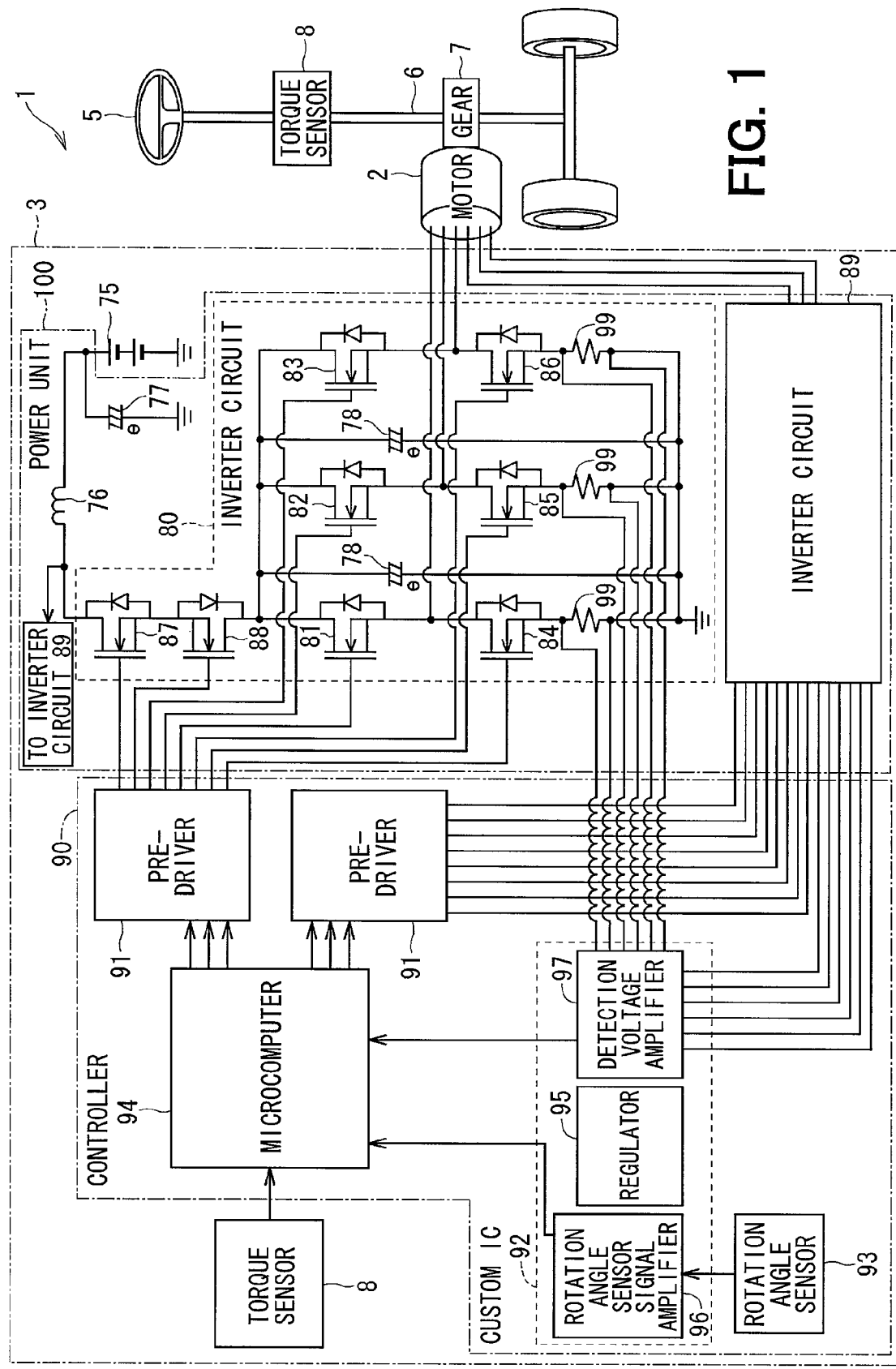
FIG. 1 is a circuit diagram of an electric power steering device with a drive unit in of the present disclosure.

Details are discussed regarding the plural embodiments of the present disclosure based on the drawing as follows. Further, like parts have like numbers in the following embodiments, with the details of each of the like parts provided only in the first appearance in the embodiment.

First Embodiment

Details are discussed regarding a drive unit 1 for the first embodiment of the present disclosure based on FIGS. 1 to 6.

The drive unit 1 is applied to an electric power steering device (i.e., "EPS" hereinafter). The drive unit 1 includes a motor 2 and a control unit 3.

With reference to FIG. 1, details regarding the electrical configuration of the EPS is described. The drive unit 1 generates a rotation torque and applies such torque on a column shaft 6 through a gear 7, which serves as a rotation axis of a steering wheel 5 of the vehicle, for assisting the steering operation by using the steering wheel 5. When the steering wheel 5 is operated by a driver, the generated steering operation torque of the column shaft 6 is detected by a torque sensor 8. In addition, speed of the vehicle is acquired from control area network (CAN). The steering operation torque detected by the torque sensor 8 and the speed of the vehicle provided by the CAN are used to determine the necessary steering assist that needs to be provided by the drive unit 1. The control provided by the drive unit 1, is not limited to EPS, but may also be used in other applications, such as anti-drifting control to automate a position of a vehicle within a lane, automate parking, or an auto-pilot of the vehicle itself.

The motor 2 is a three-phase brushless motor that rotates the gear 7 in a forward direction and a reverse direction (i.e., clockwise or counterclockwise direction). The operation of the motor 2 is controlled by the control unit 3, through supply of electricity and a feedback from its operation. The control unit 3 has a power unit 100 to supply a drive electric current for driving the motor 2 and a controller 90 to control driving of the motor 2.

The power unit 100 has a choke coil 76 on a power supply line from a power source 75, a capacitor 77, and two inverters 80, 89. Two inverters 80, 89 have the same configuration. Thus, only the inverter 80 is described.

The inverter 80 has MOSFETs 81, 82, 83, 84, 85, 86 (i.e., a metal-oxide-semiconductor field-effect transistor, or "MOS" hereinafter), which is a kind of field effect transistor. MOSs 81, 82, 83, 84, 85, 86 control its conductivity between the source and the drain based on a gate voltage, which is turned ON (i.e., conducting) or OFF (i.e., intercepted). Further, MOSs 81, 82, 83, 84, 85, 86 serve as "a switching element."

MOS 81 has its drain coupled to the power supply line, and has its source coupled to the drain of MOS 84. The source of MOS 84 is coupled to the ground. The connection point between MOS 81 and MOS 84 is coupled to a U phase coil of the motor 2.

MOS 82 has its drain coupled to the power supply line, and has its source coupled to the drain of MOS 85. The source of MOS 85 is coupled to the ground. The connection point between MOS 82 and MOS 85 is coupled to a V phase coil of the motor 2.

MOS 83 has its drain coupled to the power supply line, and has its source coupled to the drain of MOS 86. The source of MOS 86 is coupled to the ground. The connection point between MOS 83 and MOS 86 is coupled to a W phase coil of the motor 2.

Further, the inverter 80 has power relays 87, 88. The power relays 87, 88 are provided as a MOSFET that is similar to MOSs 81, 82, 83, 84, 85, 86. The power relays 87, 88 are disposed between MOSs 81, 82, 83 and the power source 75, and can intercept an electric current that may flow at a time of abnormality. More practically, the power relay 87 is disposed to intercept an electric current flowing toward the motor 2 side when snapping trouble or short-circuit trouble occurs. Further, the power relay 88 is disposed for protection of reverse connection, preventing an electric current flowing in a reverse direction.

A shunt resistor 99 is electrically coupled between MOSs 84, 85, 86 and the ground. The electric current/voltage flowing through or applied on each of the U phase coil, the V phase coil, and the W phase coil is determined by detecting the voltage applied on the shunt resistor 99.

The choke coil 76 and the capacitor 77 are electrically coupled to a point between the power source 75 and the power relay 87. The choke coil 76 and the capacitor 77 constitute a filter circuit, and reduces a noise from other devices that share the power source 75 with the drive unit 1. Further, a noise from the drive unit 1 to the other devices sharing the power source 75 is also reduced by such filter circuit.

A capacitor 78 is connected to a point between the power source side of MOSs 81, 82, 83 and the ground, which are on a power source line side. The capacitor 78 assists power supply for MOSs 81, 82, 83, 84, 85, 86 by storing an electric charge, and suppresses noise components such as a surge voltage.

The controller 90 includes a pre-driver 91, a custom IC 92, a rotation angle sensor 93 serving as a rotation detecting element, and a microcomputer 94. The custom IC 92 includes a regulator unit 95, a rotation angle sensor signal amplifier 96 and a detection voltage amplifier 97 as function blocks. The regulator unit 95 is a stabilization circuit stabilizing a power supply. The regulator unit 95 stabilizes a power supply supplied to various parts. For example, an operation of the microcomputer 94 is stabilized by a stable voltage of 5 volts from the regulator unit 95.

The rotation angle sensor 93 detects a rotation position signal of the motor 2, and outputs such signal to the rotation angle sensor signal amplifier 96. The rotation angle sensor signal amplifier 96 amplifies the rotation position signal regarding the rotation angle of the motor 2, and outputs the amplified signal to the microcomputer 94.

The detection voltage amplifier 97 detects a voltage between both ends of the shunt resistor 99, and outputs the detected voltage to the microcomputer 94 after amplifying it.

The rotation position signal of the motor 2 and the voltage of shunt resistor 99 are transmitted to the microcomputer 94. Further, the microcomputer 94, receives a steering operation torque signal from the torque sensor 8 and vehicle speed data via the CAN. To provide the necessary assist for the steering operation, the microcomputer 94 controls the inverter 80 through the pre-driver 91 according to the rotation position signal of the steering wheel and according to the vehicle speed, when the steering operation torque signal and the vehicle speed information are received. More practically, the microcomputer 94 controls the inverter 80 through the pre-driver 91 by turning MOSs 81, 82, 83, 84, 85, 86 ON or OFF. In other words, because six MOSs 81, 82, 83, 84, 85, 86 have their gates coupled to the six output terminals of the pre-driver 91, MOSs 81, 82, 83, 84, 85, 86 are turned ON or OFF by changing the gate voltage by using the pre-driver 91.

Further, the microcomputer 94 controls the inverter 80 based on the voltage of the shunt resistor 99 provided by the detection voltage amplifier 97, in order to bring a shape of an electric current supplied for the motor 2 closer to a sine wave. Further, the controller 90 controls the inverter 80 in the same manner as it controls the inverter 89.

Figure 2:
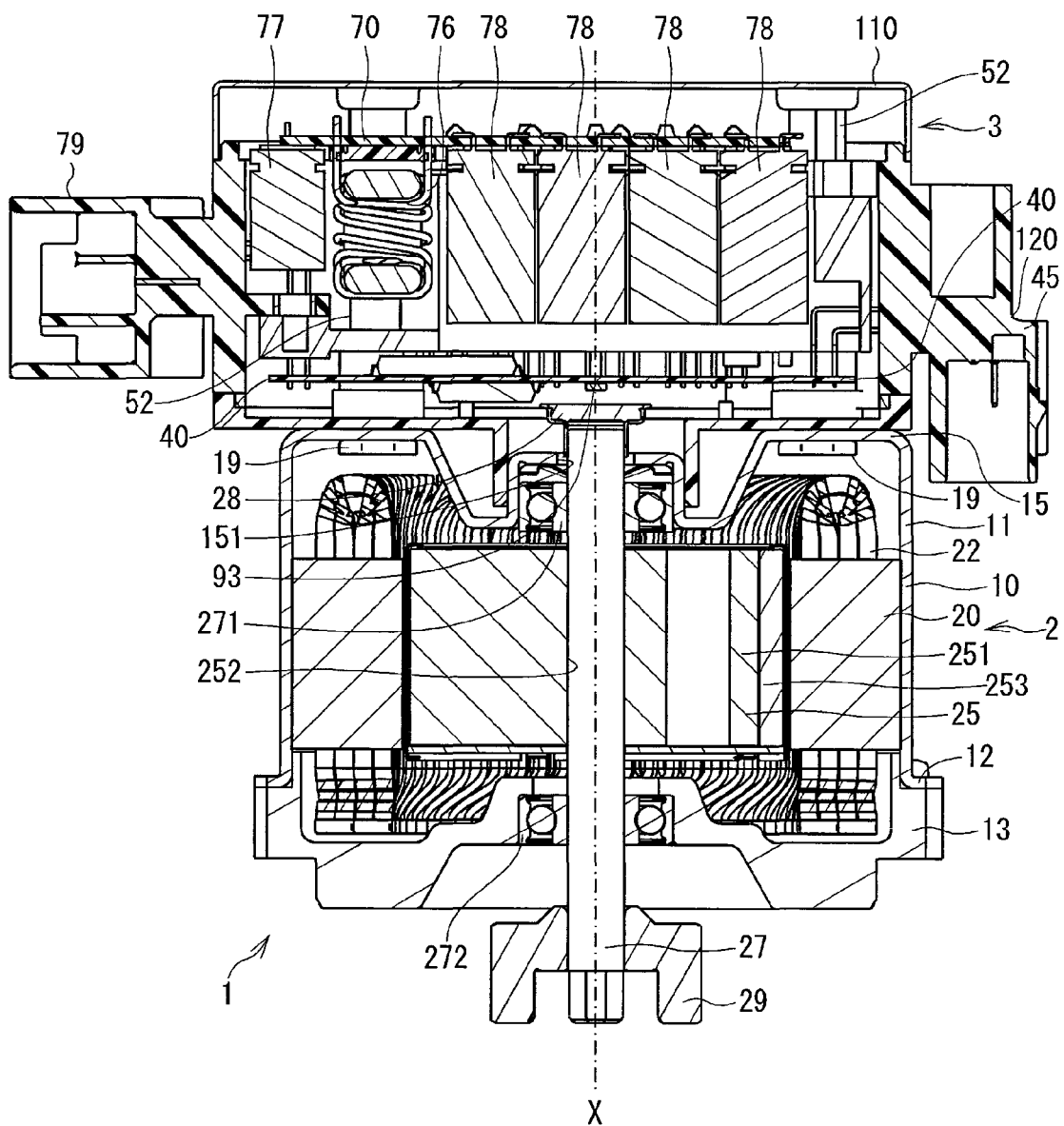
FIG. 2 is a cross-section of the drive unit along line II-II of the drive unit 1 of FIG. 4.
Figure 3:
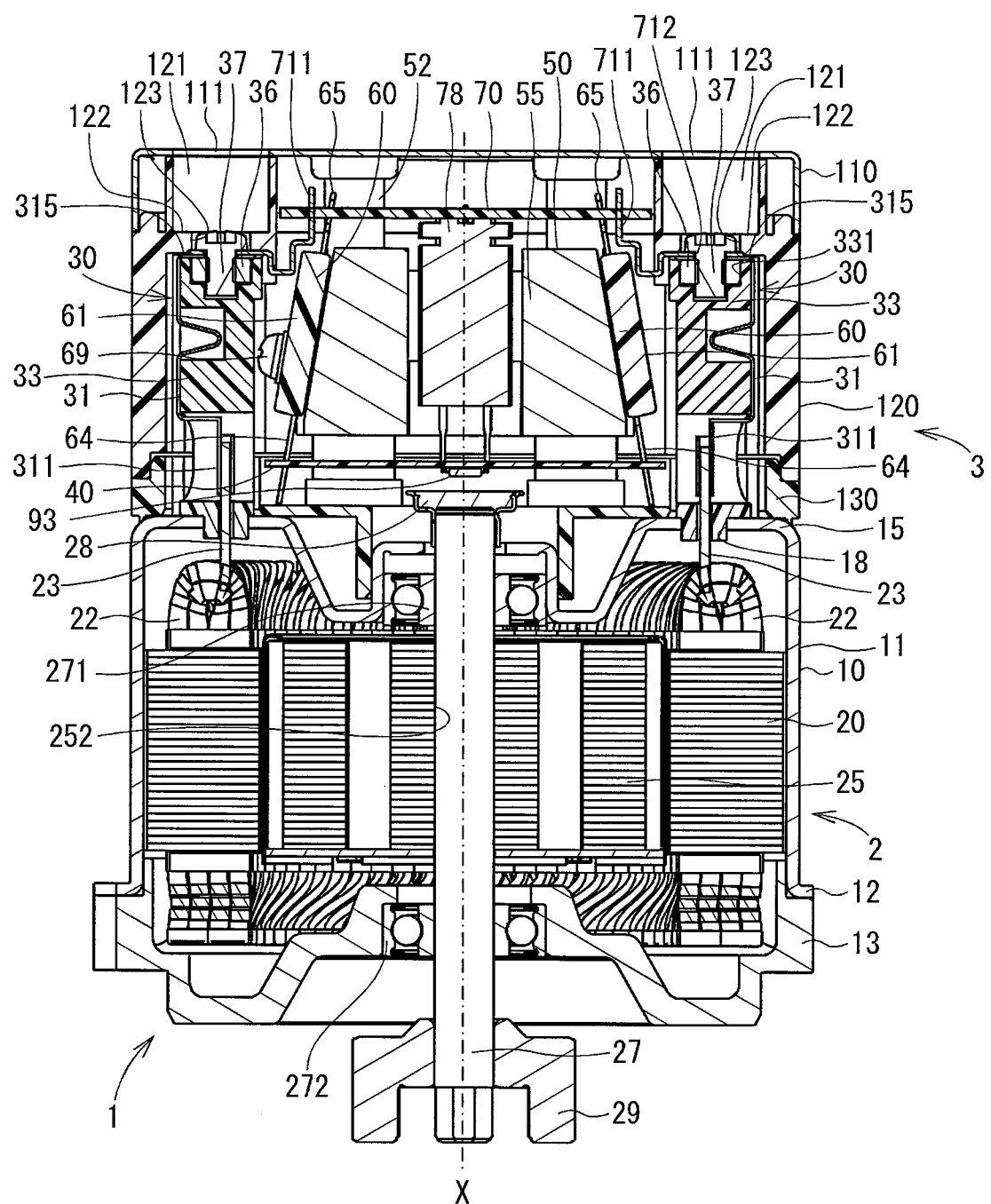
FIG. 3 is a cross-section of the drive unit along line III-III line of the drive unit 1 of FIG. 4.
Figure 4:
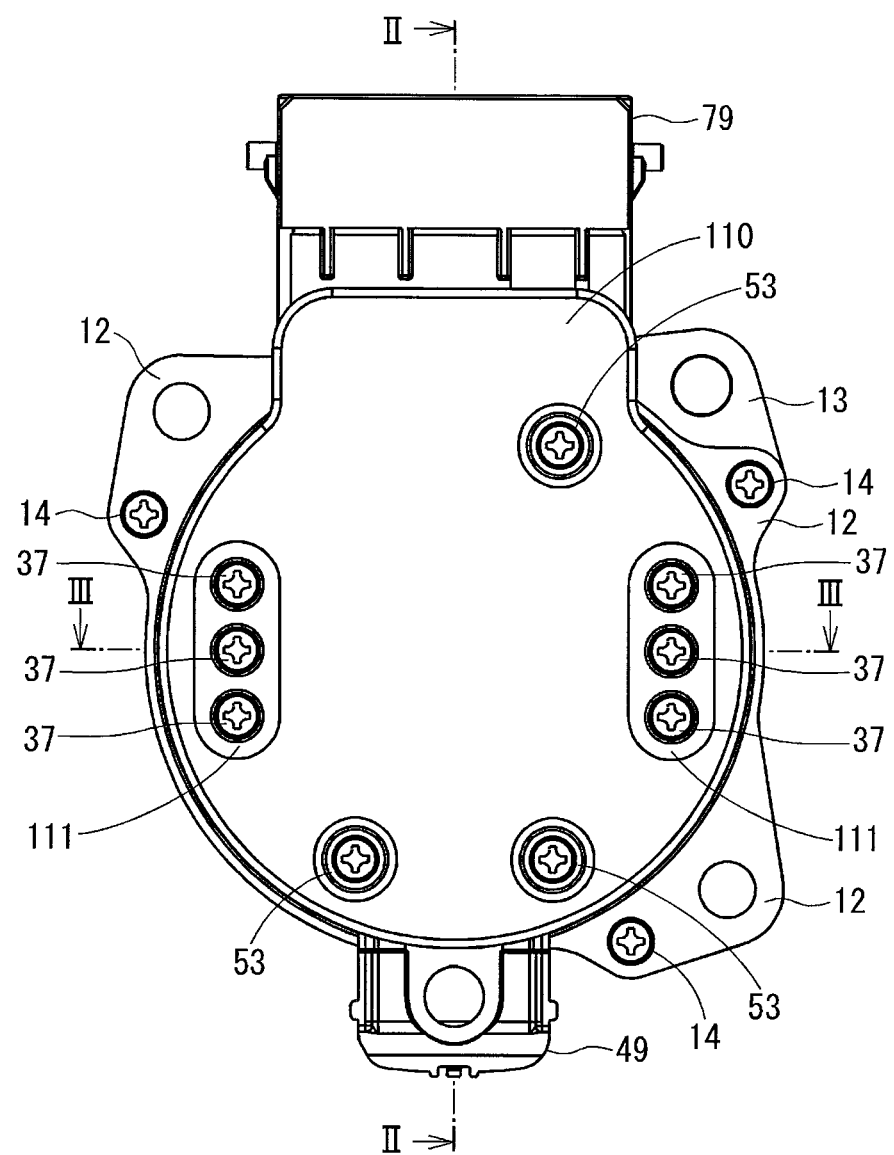
FIG. 4 is a top view of the drive unit in the first embodiment of the present disclosure.
Figure 5:
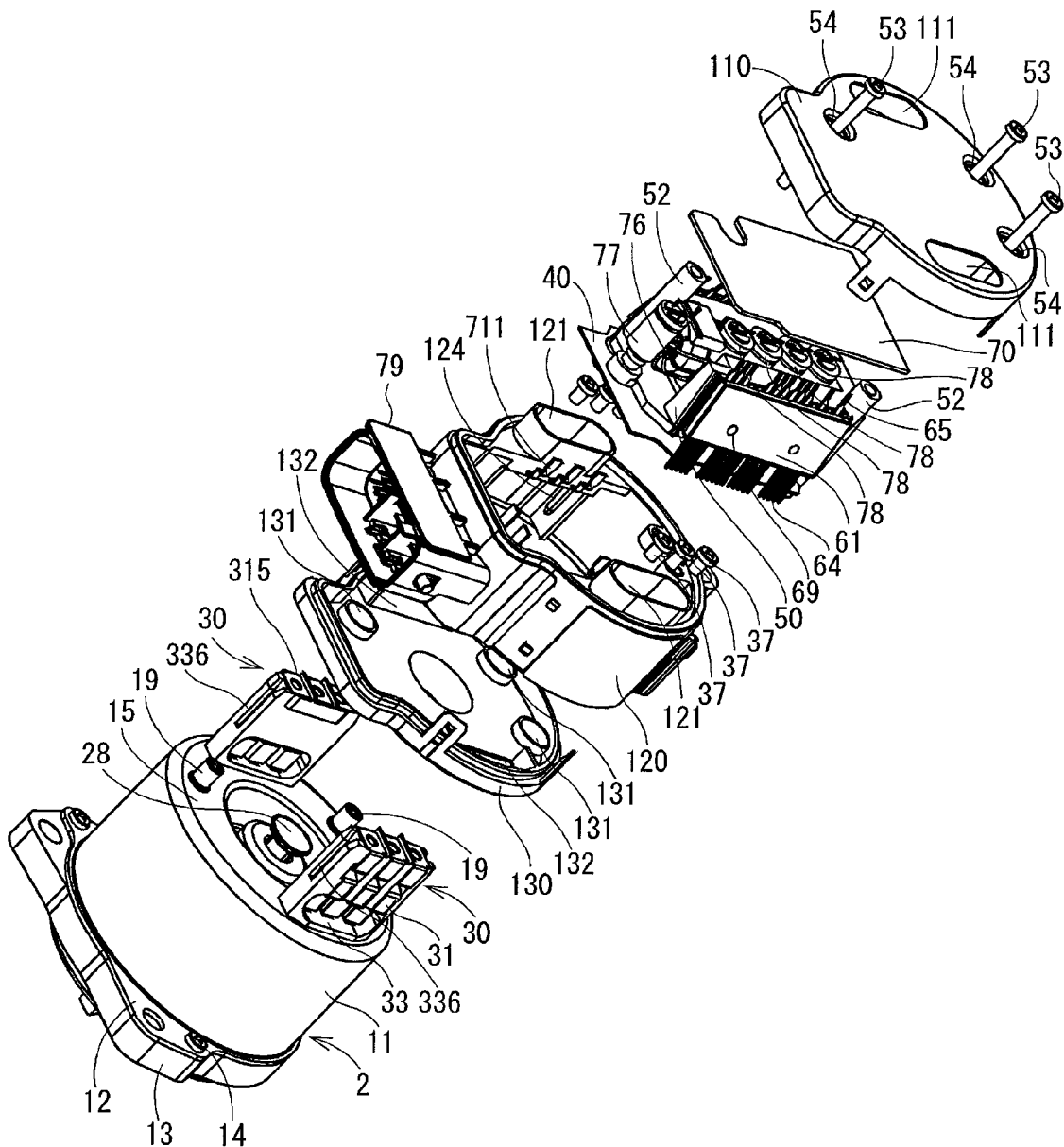
FIG. 5 is an exploded perspective view of the drive unit in the first embodiment of the present disclosure.

With reference to FIGS. 2 to 5, detail regarding the structure of the drive unit 1 in the first embodiment is discussed in the following. FIGS. 2 to 5 are illustrations that show various aspects of the drive unit 1. FIG. 2 is a cross-section along line II-II of FIG. 4, where FIG. 4 provides a top view of the drive unit 1. FIG. 3 is a cross-section along line III-III line of FIG. 4, and FIG. 5 is an exploded perspective view of the drive unit 1.

As shown in FIGS. 2 and 3, the drive unit 1 of the present embodiment has the control unit 3 disposed on one end of the motor 2, to form a stacking structure of the motor 2 and the control unit 3.

The motor 2 includes a motor case 10, a stator 20 having a winding wire 22 wound thereon, a rotor 25, and a shaft 27. An outline of the motor 2 is defined by the motor case 10. The motor case 10 is formed by a circumference wall 11 and a control-unit-side wall 15 to have a closed-end cylindrical form. The motor case 10 may be formed of metal or the like. On the end opposite of the control-unit-side wall 15, the circumference wall 11 protrudes outward to form a brim part 12, and an end frame 13 is affixed thereon by way of a fastener, such as a screw 14 (FIG. 5). The end frame 13 may be made of metal such as aluminum.

A column 19 is disposed on the control-unit-side wall 15 of the motor case 10. The column 19 may be made of aluminum or the like, and has a female screw part that has a female screw groove on its inner-surface and has a closing part. The female screw part protrudes from the outer-surface of the control-unit-side wall 15, such that when the drive unit is in an assembled condition, the female screw part extends into the control unit 3 and is aligned with a cylinder member 52, which is adjacent to a heat sink 50 of the control unit 3. The other end of the cylinder member 52 extends and abuts to the inside of a cover member 110 of the control unit 3. The cylinder member is aligned such that the inside of the cylinder member 52 is aligned with a screw hole 54 on the cover member 110. In such manner, as shown in FIG. 5, a through bolt 53 engages with the female screw part of the column 19 through the screw hole 54 and the inside of the cylinder member 52. In other words, the motor 2 and the control unit 3 are coupled via the through bolt 53.

With continuing reference to FIGS. 2 and 3, the stator 20 is arranged inside of the motor case 10. The stator 20 may have 60 pieces of a radially-inwardly projecting pole. The projecting pole has a layered iron core made by layering thin iron plates of magnetic material and an insulator that is inserted into a slot that penetrates the stator 20 in an axial direction (i.e. a direction parallel to a center axis X). The insulator has the winding wire 22 wound thereon. The winding wire 22 corresponds to each of a U phase coil, a V phase coil and a W phase coil, to form three phase winding wires.

A motor wire 23 extends from the winding wire 22. The motor wire 23 extends from an opening 18 on the control-unit-side wall 15 of the motor case 10 into the control unit 3. The end of the motor wire 23 is fixed onto a base portion 311 of a receptacle 31. A power board terminal 711 abuts on a tight end portion 315 of the receptacle 31, which is on the other side of the base portion 311 (FIGS. 3 and 5). Further, a receptacle holder 33 holding the receptacle 31 has a nut accommodation hole 331 formed on its outer wall that abuts on the tight end portion 315. The nut accommodation hole 331 accommodates a nut 36. The power board terminal 711 and the tight end portion 315 are combined with each other by using the bolt 37 and the nut 36. In such combination, the winding wire 22 is electrically coupled to a power board 70 through the motor wire 23, the receptacle 31, and the power board terminal 711. Further, one end of the receptacle holder 33 is fixed on the opening 18 of the control-unit-side wall 15. The structure of a connector 30 comprising of the receptacle 31 and the receptacle holder 33 is described later. The bolt 37 and the nut 36 are equivalent to a "screw member" in claims. The power board terminal 711 is equivalent to a "connection terminal" in claims.

The rotor 25 is disposed inside of the stator 20, and is rotatable relative to the stator 20 about the center axis X. The rotor 25 may have cylindrical shape and is made of a magnetic material, such as iron. The rotor 25 has a rotor core 251 and a permanent magnet 253 attached on a radial outside surface of the rotor core 251. The permanent magnet 253 has an N pole and an S pole arranged in turns.

The rotor core 251 defines a shaft hole 252 on an inner radial center of the rotor core 251. The shaft 27 is affixed to the shaft hole 252, and the shaft 27 is rotatably supported by a bearing 271 on the motor case 10 and a bearing 272 on the end frame 13. The shaft 27 can thus rotate with the rotor 25 relative to the stator 20 about the center axis X (i.e. the stator remains stationary while the shaft 27 and rotor 25 rotate within the stator 20). The control unit 3 side of the shaft 27 extends into a shaft hole 151 defined at the radial center of the control-unit-side wall 15 of the motor case 10, such that the shaft hole 151 is aligned with the shaft hole 252 of the rotor core 251. Accordingly, the end of the shaft 27 on the control unit 3 side is exposed from the motor case 10. Additionally, the diameter of the shaft hole 151 is greater than the outer diameter of the shaft 27, so that the motor case 10 does not interfere with the rotation of the shaft 27.

The end of the shaft 27, which is closest to the control unit 3, has a magnet 28 that rotates with the shaft 27. The magnet 28 is fixed on a magnet holder disposed on the shaft 27 and is coaxial with the shaft 27. The magnet 28 is exposed from the motor case 10 (FIG. 5). The magnet 28 is positioned in proximity to the surface of the control board 40 that faces the motor 2, such that the shaft 27 does not penetrate the control board 40.

Further, the shaft 27 has an output end 29 that extends past the end frame 13. (i.e. opposite end of the control unit 3). The output end 29 extends into a gear box (not shown) that houses the gear 7 (FIG. 1). The shaft 27 engages with the gear 7 by way of the output end 29, accordingly, the gear 7 receives an output torque from the output end 29 of the shaft 27.

With continuing reference to FIGS. 2 and 3, detail regarding the control unit 3 is described in the following. The control unit 3 includes the control board 40, the heat sink 50, a power module 60 serving as the semiconductor module, the power board 70, the cover member 110, and an ECU housing 120. The cover member 110 and the ECU housing 120 are equivalent to a "control unit case" in claims.

The control unit 3 has a control connector 45 that couples the control unit 3 with external components and a power connector 79. Majority of the components of the control unit 3 are provided within a circular outer boundary of the drive unit 10 (FIG. 4), except for certain parts that are primarily positioned external to and protrudes from the ECU housing 120, such as the power connector 79. In addition, as shown in FIG. 3, the control unit 3 is arranged to have the heat sink 50 and the power module 60 substantially between the control board 40 and the power board 70, where the control board 40 is provided on the motor 2 side of the control unit 3.

The control board 40 may be provided as four levels of boards formed by a glass epoxy, and is formed in a board shape, such that the control board 40 may partially or substantially fit an area relative to motor case area. Various electronic parts constituting the controller 90 are disposed on the control board 40. Specifically, the pre-driver 91, the custom IC 92, and the microcomputer 94 are disposed on the side of the control board 40 that faces the power board 70. Further, the rotation angle sensor 93 is disposed on the side of the control board 40 that faces the motor 2. The rotation angle sensor 93 is disposed at a position facing the magnet 28. Further, the magnet 28 and the rotation angle sensor 93 are arranged coaxially on the center axis X of the shaft 27 and rotor 25. The rotation angle sensor 93 detects an angle of rotation of the shaft 27 by detecting the change of the magnetic field caused by the rotation of the magnet 28, which rotates with the shaft 27 and the rotor 25 as one body.

On the control board 40, a through hole is formed along the periphery of the control board 40 to couple to a control terminal 64 of the power module 60. Further, the control board 40 is coupled to the control connector 45.

With reference to FIG. 2, the control connector 45 is positioned off of an outer surface of the ECU housing 120, such that it extends in a direction parallel to the center axis X towards the motor 2. The control connector 45 is positioned next to the outer surface of the motor case 10, and a wiring for receiving an input of signals such as signals from the CAN, is connectable to the connector 45 from a direction along an axis of the motor 2 from the motor 2 side. In the present embodiment, the control connector 45 has an opening directed towards the motor 2 side of the drive unit 1 (FIG. 2).

The heat sink 50 may be made of a material having high heat conductivity, such as aluminum. A base-surface of the heat receiving portion 55, which does not have the control connector 45, faces the control board 40, such that the heat receiving portion 55 is positioned in a direction that is substantially perpendicular to the control board 40 or the control-unit-side wall 15. Additionally, a longitudinal-surface of the heat receiving portion 55 is perpendicular to the base-surface and substantially parallel to the center axis X. There are two heat receiving portions 55 disposed in parallel with each other, and along each of the two heat receiving portions 55, the power module 60 is disposed.

The power module 60 is vertically positioned on an outer-surface of the heat sink 50. Between the power module 60 and the heat sink 50, a heat radiation sheet (not illustrated) is disposed. The power module 60 with the heat radiation sheet is attached to the heat sink 50 by way of a fastener, such as a screw 69. In such manner, the power module 60 is held by the heat sink 50 with the heat radiation sheet interposed therebetween. The heat produced from the power module 60 is dissipated to the heat sink 50 through the heat radiation sheet.

Further, though not illustrated, one side of the power module 60 on the heat receiving portion 55 side has a part of the wiring pattern exposed from a mold part 61 of the power module 60 as a metal radiation part, for contacting and efficiently dissipating heat to the heat receiving portion 55 of the heat sink 50. The heat radiation sheet conducts heat from the power module 60 to the heat receiving portion 55, and maintains insulation of the heat receiving portion 55 from the power module 60.

The power module 60 has MOSs 81, 82, 83, 84, 85, 86 which are used as a switching element for switching supply of an electric current to the winding wire. The power module 60 also includes MOSs 81, 82, 83, 84, 85, 86, 87, 88, and the shunt resistor 99, which are electrically coupled by way of, for example, copper wires, and is molded by the mold part 61.

A relation between the power module 60 and the circuit in FIG. 1 is now described. One of the power modules 60 corresponds to the inverter 80 (FIG. 1), and has MOSs 81, 82, 83, 84, 85, 86, the power relays 87, 88, and the shunt resistor 99 shown in FIG. 1. In other words, the present embodiment has MOSs 81, 82, 83, 84, 85, 86, the power relays 87, 88 and the shunt resistor 99 molded as one body by a resin mold. Further, the other one of the power module 60 corresponds to the inverter 89, and has MOS, a power relay and a shunt resistor for constituting the inverter 89. In other words, in the present embodiment, one power module 60 corresponds to one system of an inverter circuit. Further, one heat receiving portion 55 is disposed corresponding to one power module 60 that constitutes one drive system.

The power module 60 has the control terminal 64 and a power terminal 65 projecting from the mold part 61. The control terminal 64 is formed on a face on an end of the mold part 61, which is perpendicular to the heat receiving portion 55 of the heat sink 50. Further, the power terminal 65 is formed in parallel with the face having the control terminal 64. In the present embodiment, the power module 60 has the control terminal 64 arranged on the control board 40 side, and has the power terminal 65 arranged on the power board 70 side, both residing on the heat receiving portion 55 of the heat sink 50 with its orientation vertically aligned to the heat receiving portion 55. In other words, the control terminal 64 protrudes toward the control board 40 side, and the power terminal 65 protrudes toward the power board 70 side.

The control terminal 64 is inserted into a through hole of the control board 40, and is electrically coupled to the control board 40 by way of, for example, soldering. Through the control terminal 64, a control signal from the control board 40 is transmitted to the power module 60. Further, the power terminal 65 is inserted into a through hole formed on the power board 70, and is electrically coupled to the power board 70 by way of, for example, soldering. An electric current supplied for the winding wire 22 through the power terminal 65 is then supplied for the power module 60.

The power board 70 may be formed by a glass epoxy, and has four layers of thick copper pattern, to have a board shape, such that the power board 70 may partially or substantially fit an area relative to motor case area. The power board 70 has a power wire formed thereon that allows a winding wire electric current to flow to the winding wire 22 through the power board terminal 711 and the receptacle 31.

The choke coil 76 and the capacitors 77, 78 are disposed on the side of the power board 70 that faces the control board 40 (i.e. the motor 2). The choke coil 76 and the capacitors 77, 78 are disposed in a space formed in an inside of the heat sink 50. Further, in an axial direction of the motor 2, the choke coil 76 and the capacitors 77, 78 are disposed at a position between the power board 70 and the control board 40.

The choke coil 76 is formed in the shape of a cylinder, which has a longitudinal (i.e., axial) dimension being shorter than a radial dimension that is taken along the radius of the cylinder. The choke coil 76 is arranged so that the axis of the coil 76 is substantially perpendicular to the center axis X of the shaft 27.

Both of the capacitors 77, 78 are aluminum electrolytic capacitors. Further, the capacity of four capacitors 78 is larger than the capacitor 77. Further, the types of the capacitors 77, 78 are not only the aluminum electrolytic type, but may also be other types of capacitors.

Further, the power connector 79 is coupled to the power board 70. The power connector 79 is formed on an outer wall of the ECU housing 120. In the present embodiment, the power connector 79 is disposed on the other side of the control connector 45 across the center axis X of the motor 2 (FIGS. 2 and 5). The power connector 79 is coupled to the power source 75, with its wiring connectable in a substantially perpendicular direction against an axial direction of the drive unit 1 (FIG. 2). Through such connection, the electricity is supplied from the power source 75 via the power connector 79 for the power board 70. Further, the electricity from the power source 75 is supplied for the winding wire 22 wound on the stator 20, through the power connector 79, the power board 70, the power module 60, and the motor wire 23.

With reference to FIGS. 3 and 5, the ECU housing 120 has a concave 121. The concave 121 is formed at two positions on either side of the ECU housing 120 on an upper surface of the ECU housing 120, such that the concave 121 are positioned across from each other on the upper surface. Additionally, neither the control connector 45 nor the power connector 79 are disposed on or protrude from the outer-surface of the ECU that is closest to the concave 121. Specifically, the ECU housing 120 may be arranged to have the control connector 45, the power connector 79, and the concaves 121 disposed substantial equidistant from each other along the surface of the ECU housing 120. Such that, the control connector 45 and the power connector 79 are across from each other and extend outward from the outer-surface of the ECU housing 120, and the two concave 121 are across from each other and extend upward from the outer-surface of the ECU housing 120.

An opening 111 is defined on the cover member 110, and the concave 121 extends into the opening 111. The concave 121 has a bottom 122 defined on an inner lower surface of the concave 121. The bottom 122 further defines a bolt hole 123 for the bolt 37. The bolt 37 is inserted in the concave 121 through the opening 111 fastens with the nut 36, which is housed in the accommodation hole 331, the tight end portion 315 of the receptacle 31, and the power board terminal 711. Further, one end of the power board terminal 711 is coupled to the bottom 122 of the concave 121. Further, when the drive unit 1 is used, foreign matter does not come into the concave 121 since the opening 111 is closed by a cover not illustrated.

A cover part 130 is disposed on a side of the control unit 3 that faces the motor 2, such that the cover part 130 serves as a bottom end of the control unit 3. The cover part 130 defines a column opening 131 for receiving the column 19 and a connector opening 132 for receiving the connector 30. The connector 30 fixed on the control-unit-side wall 15 of the motor 2 comes into the control unit 3 through the connector opening 132.

Figure 6A:
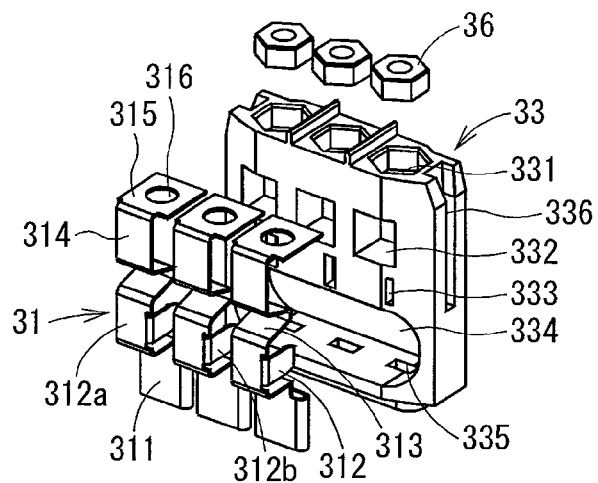
FIGS. 6A, 6B, and 6C are perspective views of a connector of the drive unit in the first embodiment of the present disclosure.
Figure 6B:
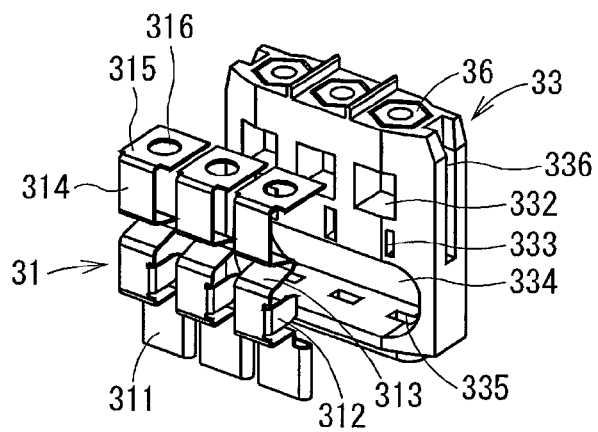
Figure 6C:
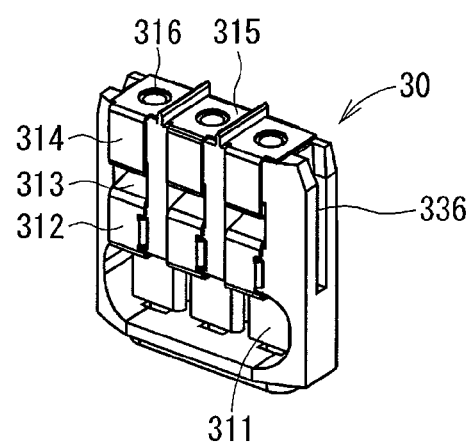

The structure of the connector 30 is described with reference to FIGS. 6A, 6B, and 6C. The connector 30 includes of the receptacle 31 to couple the power board terminal 711 to the motor wire 23 and the receptacle holder 33 to hold the receptacle 31. FIG. 6A is an exploded perspective view of the receptacle 31 and the receptacle holder 33, FIG. 6B is a perspective view of the receptacle holder 33 having the nut 36 housed therein, and FIG. 6C is a perspective view of the receptacle holder 33 in a combined state with the nut 36.

The receptacle 31 is made of conductive material such as, for example, metal. In terms of correspondence, one receptacle 31 corresponds to three motor wires 23. The receptacle 31 has the base portion 311, which is positioned on a side of the receptacle 31 that would be facing the motor 2, an engage portion 312 connected to an end of the base portion 311, a bent portion 313 connected to an end of the engage portion 312, an extension portion 314 connected to the bent portion 313, and the tight end portion 315, which is connected to the power board terminal 711 by the bolt 37 in an assembled condition of the drive unit 1.

With continuing reference to FIG. 6A, the base portion 311 is formed in a flat cylinder shape with a hole through which the motor wire 23 is inserted from the opening 18 of the motor 2.

The engage portion 312 connects to an end of the base portion 311 (i.e. an end of the base portion 311 farthest from the motor 2). The engage portion 312 has a vertical part 312a extending substantially in a vertical direction and a horizontal part 312b extending substantially in a horizontal direction. The horizontal portion 312b engages with an engage slit 333 of the receptacle holder 33, to be mentioned later, for determining a position of the receptacle 31 relative to the receptacle holder 33 (i.e. for aligning the receptacle 31 with the receptacle holder 33).

The bent portion 313 extends from an end of the engage portion 312, and has a bent, which bends substantially in a horizontal direction, from which the bent portion 313 extends. When the base portion 311 and the tight end portion 315 is coupled to the motor wire 23 and to the power board terminal 711 respectively, the bent portion 313 expands or contracts in a longitudinal direction to adjust the longitudinal length of the receptacle 31.

The extension portion 314 is formed in a board shape, and extends in an upper direction substantially in parallel with the base portion 311. One end of the extension portion 314 is connected to the extension portion 314.

The tight end portion 315 is formed in a flat board shape, and extends substantially in a horizontal direction from the upper end of the extension portion 314. At the center of the tight end portion 315, a through hole 316 is formed, into which the bolt 37 is inserted to couple with the power board terminal 711. The center of the through hole 316 is positioned substantially above the motor wire 23 that is to be affixed to the base portion 311.

The receptacle holder 33 is formed substantially in a rectangular box shape, and, is made of, for example, an insulation material. The top surface of the receptacle holder 33 has the nut accommodation hole 331, for accommodating the nut 36, at three positions that are arranged along a longer dimension of the receptacle holder 33. Further, at the center of the receptacle holder 33, a cavity 332 is formed at three positions on one side for receiving the receptacle 31. The bent portion 313 of the receptacle 31 is accommodated in the cavity 332. Below the cavity 332, the engage slit 333 to engage the horizontal portion 312b of the receptacle 31 is formed in the longitudinal (i.e., vertical) direction.

The receptacle holder 33 defines an opening 334 that is substantially perpendicular to the axial direction of the receptacle holder 33. Specifically, the receptacle holder 33 defines an opening 334 below the cavity 332 and the engage slit 333, such that the opening 334 extends across a width of the receptacle holder 33 to include the area below all three cavity and the area therebetween. Further, the receptacle holder 33 defines within the opening 334 an insertion hole 335 on an inner-surface of the receptacle holder 33, the inner-surface being parallel to the surface of the control-unit-side wall 15 (i.e. among the inner walls of the opening 334, the insertion hole 335 is defined on the wall closest to the motor 2). The motor wire 23 is inserted from a lower part of the receptacle holder 33 into the insertion hole 335, and the end of the motor wire 23 enter the insertion hole 335, and extends into the opening 334.

Further, a guide groove 336 is defined on an outer-side-wall surface of the receptacle holder 33, such that the guide groove 336 extends substantially from an upper surface (i.e. close to the nut accommodation hole 331) of the receptacle holder 33 downward to a position that is approximately a center position of the side wall surface. When the motor 2 having the connector 30 installed thereon and the control unit 3 are attached, the guide groove 335 engages with a guide 124, defined in the ECU housing 120, for positioning the connector 30 (FIG. 5).

The assembly of the connector 30, the motor wire 23, and the power board terminal 711 is described in the following. With reference to FIG. 6B, the nut 36 is placed in the nut accommodation hole 331 of the receptacle holder 33. Subsequently, as shown in FIG. 6C, the receptacle 31 is assembled on the receptacle holder 33, such that the horizontal portion 312b of the engage portion 312 couples with the engage slit 333, in order to align the receptacle 31 and the receptacle holder 33. Next, at the time of assembling the connector 30 and the motor 2, the motor wire 23 is inserted into the insertion hole 335 of the opening 334, and then into the base portion 311 via the hole of the base portion 311. The motor wire 23 inserted in the base portion 311 is affixed onto the base portion 311 by performing, for example, a heat caulking from the opening 334. Then, the control unit 3 is attached on the motor 2, on which the connector 30 is already attached, from an opposite side of the output end 29. The bolt 37 is then inserted into the bolt hole 123 from the concave 121 of the ECU housing 120. The inserted bolt 37 is engaged with the nut 36 through a through hole 712 of the power board terminal 711 and the through hole 316 of the receptacle 31. In such manner, the power board terminal 711 and the receptacle 31 are electrically coupled.

(Operation of Drive Unit 1)

Here, details are discussed regarding the operation of the drive unit 1.

The microcomputer 94 on the control board 40 generates a pulse signal that is generated by pulse-width modulation (PWM) control through the pre-driver 91, based on the signals from the rotation angle sensor 93, the torque sensor 8, the shunt resistor 99, and the like, for assisting the steering operation of the steering wheel 5 according to a vehicle speed.

The pulse signal is output to the two systems of the inverters 80, 89 that are made by the power module 60 via the control terminal 64, and controls an ON-OFF switching operation of MOSs 81 to 86. In such manner, each phase of the winding wire 22 receives a sine wave electric current having a respectively different wave phase, thereby generating a rotating magnetic field. By receiving such a rotating magnetic field, the rotor 25 and the shaft 27 rotate as one body. Then, by the rotation of the shaft 27, a driving force is output from the output end 29 of the motor 2 to the gear 7 on the column shaft 6, for assisting the steering operation of the steering wheel 5 by the vehicle driver.

In other words, by the supply of the electric current for the winding wire 22, the motor 2 is driven. Thus, the electric current supplied for the winding wire 22 may be designated as a driving current to drive the motor 2.

Heat from MOSs 81 to 88 of the power module 60, which is generated during the switching operations of the MOSs, is dissipated to the heat sink 50 through the heat radiation sheet to prevent the drive unit 1 from overheating. Further, the size of the stator 20 and/or the rotor 25 may be changed depending on the required output.

Advantageous Effects (A) The connector 30, which electrically connects the control unit 3 to the motor 2, includes the receptacle 31 and the receptacle holder 33. Among these parts, one end of the receptacle 31 (i.e. the base portion 311) is fixedly coupled to the motor wire 23 by, for example, soldering or binding. Further, the other end of the receptacle 31 (i.e. the tight end portion 315) is coupled to the power board terminal 711 with the bolt 37 and the nut 36. By devising such structure, the motor 2 and the control unit 3 can be easily separated by removing the bolt 37 that couples the tight end portion 315 and the power board terminal 711, and the electrical connection between the motor wire 23 and the power board terminal 711 can be easily decoupled. Further, by fastening the bolt 37 (again), the motor 2 and the control unit 3 can be easily attached (again), and the motor wire 23 and the power board terminal 711 are electrically coupled (again).

(B) The receptacle 31 is held in the receptacle holder 33, and is accommodated in the ECU housing 120 of the control unit 3. Therefore, the motor wire 23 and the power board terminal 711 can be electrically decoupled and re-coupled again without increasing the size of the drive unit 1.

(C) The motor 2 and the control unit 3 are coupled with each other by the through bolt 53 engaged with the column 19 through the cylinder member 52 from the cover member 110. Further, the electrical connection between the motor 2 and the control unit 3 is enabled by the connection between the tight end portion 315 of the receptacle 31 and the power board terminal 711 by using the bolt 37 and the nut 36. In such connection, the bolt 37 is inserted through the opening 111 of the cover member 110 toward the motor 3 side from the control unit 2 side. Therefore, the control unit 3 can easily be removed/separated from the motor 2 without removing/separating the motor 2 from the column shaft 6.

(D) Further, the motor 2 and the control unit 3 are coupled with each other by the bolt 37 inserted through the opening 111 on the cover member 110 and by the through bolt 53 inserted through the screw hole 54. In such manner, the motor 2 and the control unit 3 are coupled by a one-side work of a mechanic or a robot from the cover member 110 side (i.e., from one position relative to the drive unit). Therefore, a man-hour required for an assembly of the drive unit 1 is reduced.

(E) The receptacle holder 33 holds the receptacle 31 along an axial direction of the motor 2 (i.e. the center axis X of the motor 2) for connecting the motor 2 to the control unit 3. In such structure, the strength of the receptacle holder 33 in the axial direction of the motor 2 is increased, along which direction the attachment and detachment of the motor 2 and the control unit 3 is performed. Therefore, the force applied from the receptacle 31 to the receptacle holder 33 in the axial direction of the motor 2 during the assembly and disassembly of the drive unit 1 is securely bearable (i.e., borne) by the receptacle holder 33.

(F) The receptacle holder 33 is made of an insulation material such as resin, or the like. Therefore, the insulation of the receptacle 31 in the receptacle holder 33 is secured.

Second Embodiment

Figure 7:
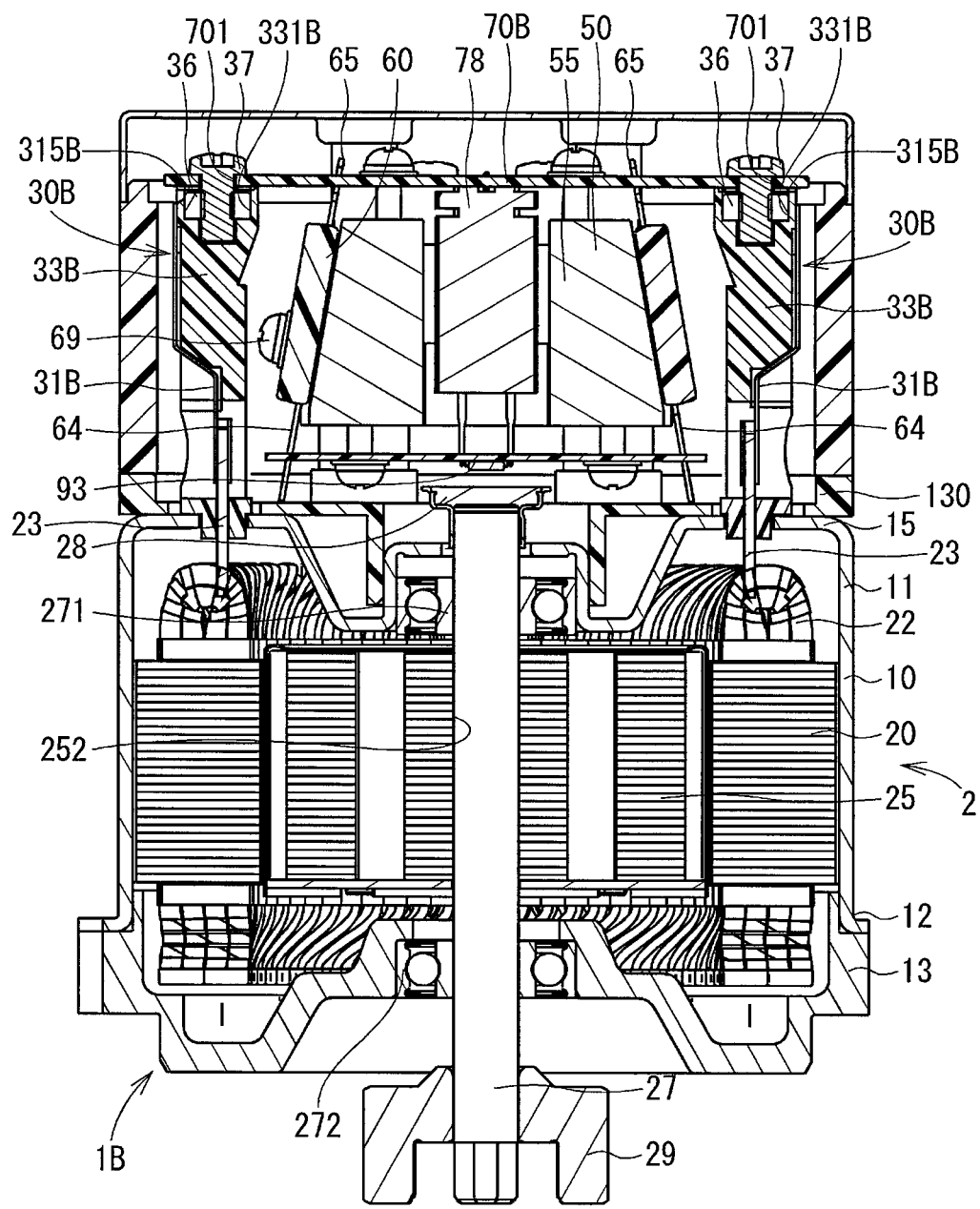
FIG. 7 is a cross-section of a drive unit in a second embodiment of the present disclosure.
Figure 8:
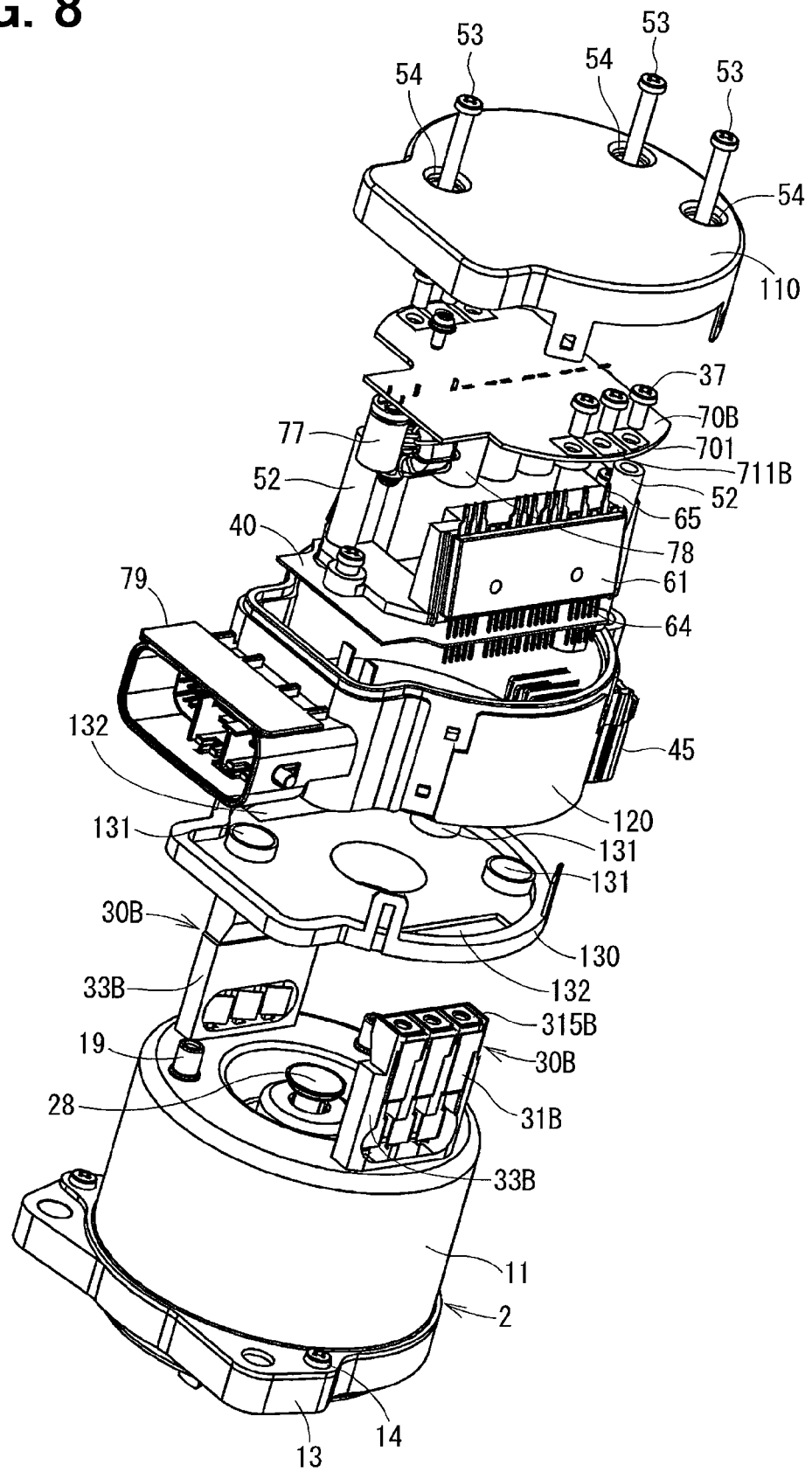
FIG. 8 is an exploded perspective view of the drive unit in the second embodiment of the present disclosure.

With reference to FIGS. 7 and 8, in the second embodiment, the shape of the terminal on the power board side, which is connected to the receptacle, is different from the first embodiment. Further, the same numerals indicate substantially the same parts as the first embodiment, and the description of such part is omitted from the second embodiment.

In a drive unit 1B of the second embodiment, a receptacle 31B is directly coupled to a power board 70B, which is coupled to a receptacle holder 33B to form a connector 30B. More practically, a through hole 701 for receiving the bolt 37 is formed at positions on the power board 70B where tight end portions 315B are abutted. The through hole 701 is formed at six positions on the power board 70B, which correspond to the number of the motor wires 23 as shown in FIG. 8. The through hole 701 has a metal wiring plate 711B of the power board 70B. The receptacle 31B is fastened directly to the power board 70B by the bolt 37. In such structure, the receptacle 31B and the power board 70B are electrically coupled with each other. In such structure, the bold 37 is engaged with the nut 36 that is accommodated in a nut accommodation hole 331B of the receptacle holder 33B. The metal wiring plate 711B is equivalent to a "connection terminal" in claims.

In the second embodiment, the receptacle 31B and the power board 70B are directly coupled through the through hole 701 and by the metal wiring plate 711B formed on the power board 70B. In such structure, the reduction of the number of parts for the electrical connection between the control unit 3 and the motor 2 is achieved, in addition to the advantageous effects A through F in the first embodiment.

Third Embodiment

Figure 9:
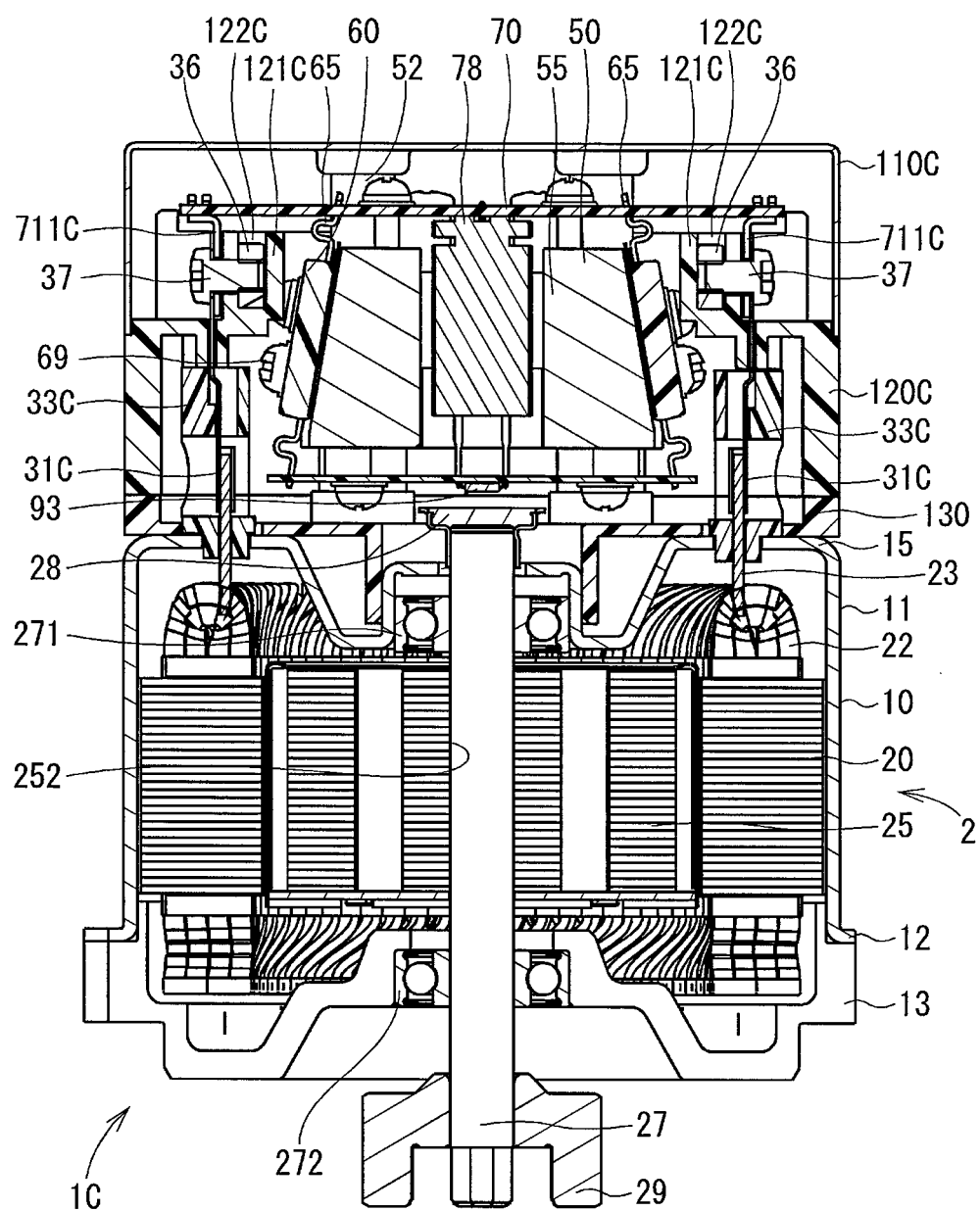
FIG. 9 is a cross-section of a drive unit in a third embodiment of the present disclosure.
Figure 10:
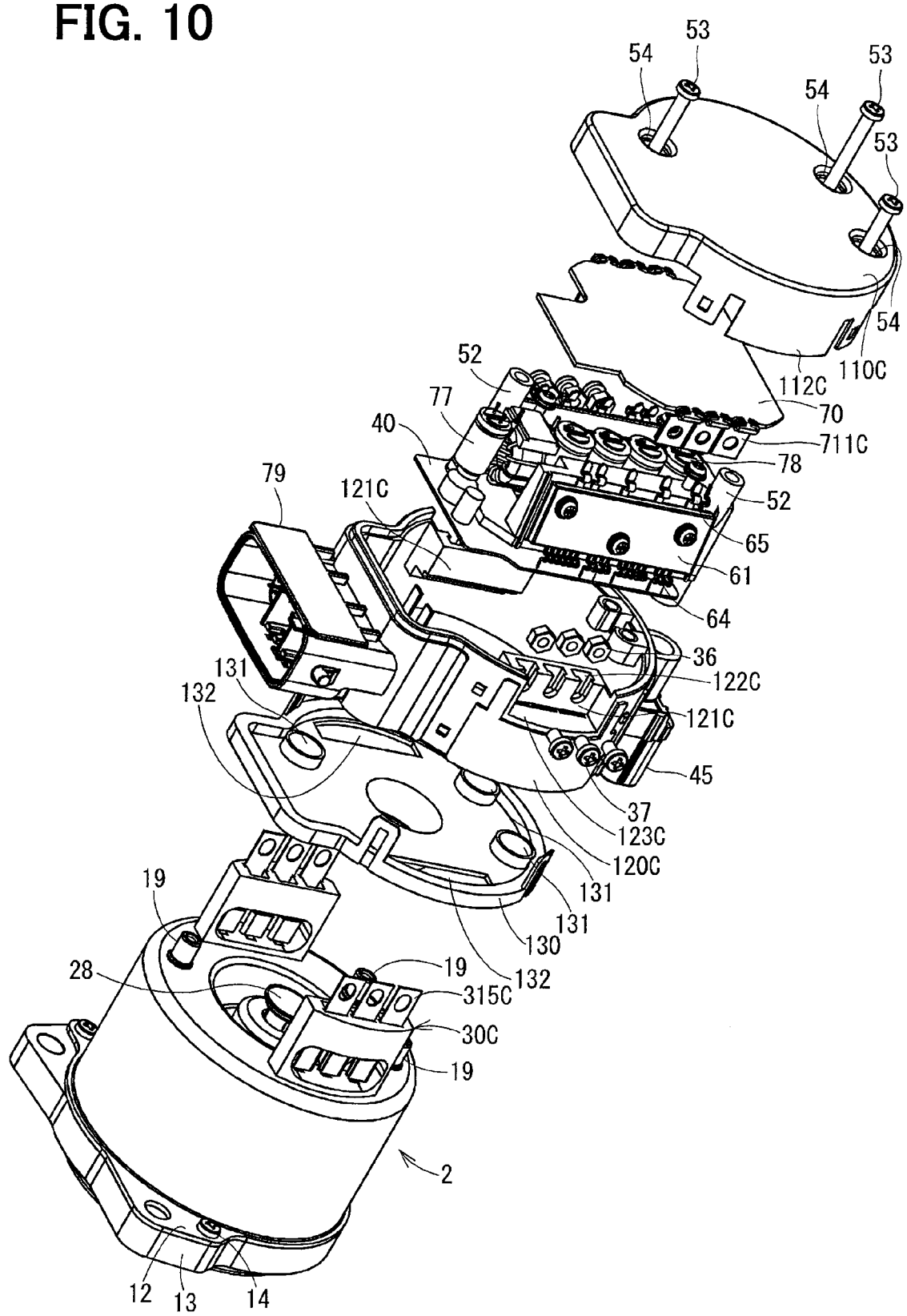
FIG. 10 is an exploded perspective view of the drive unit in the third embodiment of the present disclosure.

With reference to FIGS. 9 to 11, in the third embodiment, the shapes of the ECU housing, the receptacle and the receptacle holder are partially different from the first embodiment. Further, the same numerals indicate substantially the same parts as the first embodiment, and the description of such parts are omitted in the following.

A tight end portion 315C of a receptacle 31C is inserted in a tight end portion 121C formed on an ECU housing 120C in a drive unit 1C of the third embodiment. The tight end portion 315C of the receptacle 31C is coupled to a power board terminal 711C on the power board 70 by fastening of the bolt 37. The nut 36 engaging with the bolt 37 in such structure is accommodated in a nut accommodation hole 122C defined by the tight end portion 121C of the ECU housing 120C. The nut accommodation hole 122C has an opening to insert the nut 36 on a cover member 110C side. Further, the bolt 37 is inserted into the nut 36 substantially in a perpendicular direction along the axis of the motor 2 (FIG. 10). After connecting the tight end portion 315C of the receptacle 31C to the power board terminal 711C by the bolt 37, an opening 123C on the side of the ECU housing 120C is covered by a cover unit 112C formed on the side of a cover member 110C. Such structure prevents foreign matter from falling into the tight end portion 121C.

Figure 11A:
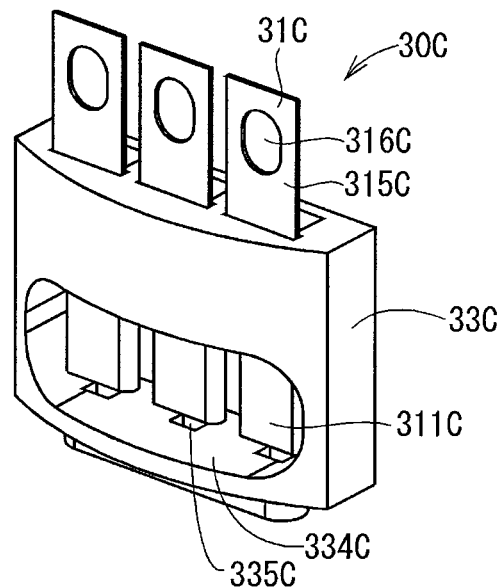
FIGS. 11A and 11B are perspective views of a connector of the drive unit in the third embodiment of the present disclosure.
Figure 11B:
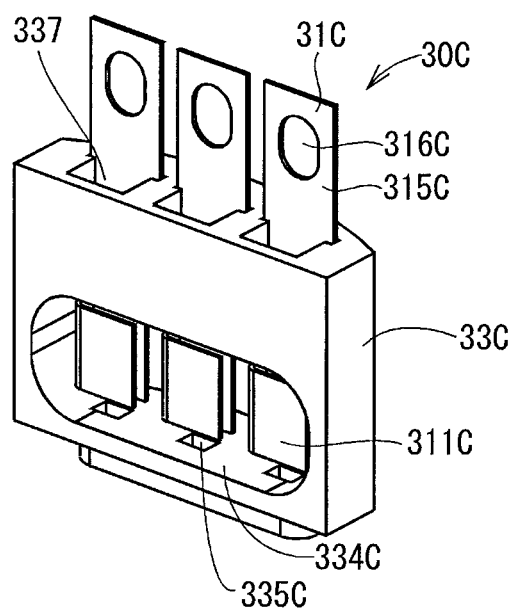

With reference to FIGS. 11A and 11B, a connector 30C has the receptacle 31C and a receptacle holder 33C.

In the third embodiment, the receptacle 31C has the base portion 311C for fixing the motor wire 23 and the tight end portion 315C to the power board 70. One end of the tight end portion 315C on the motor 2 side is coupled to one end of the base portion 311C. The other end of the base portion 311C is coupled to the motor wire 23, similar to the first embodiment. The tight end portion 315C substantially has a board shape that extends in the axial direction of the drive unit 1C (i.e. the center axis X drive unit 1C). Around the center of the tight end portion 315C, an insertion hole 316C opening is defined.

The receptacle holder 33C in the third embodiment may substantially have a rectangular box shape, and may be made of, for example resin. The receptacle holder 33C defines, on side closest to the motor 2, an opening 334C in a direction that is substantially perpendicular to the axis of the receptacle holder 33C. The opening 334C is similar to the opening 334 of the first embodiment. Further, from among the inner walls defining the opening 334C, one wall on the motor 2 disposed side has an insertion hole 335C, similar to the insertion hole 335 of the first embodiment, to provide access to a lower space in (FIGS. 11A and 11B). The motor wire 23 are inserted into the insertion hole 335C from below the receptacle holder 33C. Further, among the inner walls defining the opening 334C, an insertion hole 337 is defined on an inner wall that is opposite to the wall on which the insertion hole 335C is defined, such that a through hole is provided from the insertion hole 337 to the insertion hole 335 and to the motor case 10. The receptacle 31C is inserted into the insertion hole 337 from above the receptacle holder 33C.

Other Embodiments

Although the present invention has been fully described in connection with the preferred embodiment thereof with reference to the accompanying drawings, it is to be noted that various changes and modifications will become apparent to those skilled in the art.

(a) It is assumed in the above embodiments that the receptacle and the power board terminal are coupled by a screw member. However, the screw member may be used at other positions. That is, the receptacle and the motor wire may be coupled by the screw member.

(b) In the first embodiment described above, the receptacle has the base portion, the engage portion, the bent portion, the extension portion, and the tight end portion. However, the shape of the receptacle is not necessarily limited to such example. For example, the receptacle may only have (i) the base portion fixed on one of the motor wire or the power board terminal and (ii) the tight end portion connected by the screw member to the other one of the motor wire or the power board terminal.

(c) In the above-mentioned embodiment, the receptacle held by the receptacle holder is used to couple the control unit to the motor. However, the control unit and the motor may be coupled with each other by using other parts. The control unit and the motor may be coupled with each other solely by using the receptacle.

Such changes and modifications are to be understood as being within the scope of the present invention as defined by the appended claims.

What is claimed is:

1. A drive unit comprising:
   a motor housed in a motor case that has a closed end, the motor including
   a stator on which winding wires are wound to present multiple phases, the winding wires being electrically coupled to a motor wire, the motor wire extending parallel to a rotational axis of the motor,
   a rotor disposed inside of the stator, and
   a shaft disposed in and coupled to the rotor, wherein the rotor and the shaft rotate relative to the stator;
   a control unit disposed on one end of the motor case, the control unit including
   a semiconductor module including a switching element for switching electricity supplied to the winding wires;
   a connection terminal electrically coupled to the switching element; and
   a control unit case housing the semiconductor module therein; and
   a fastener having a receptacle and a receptacle holder that holds the receptacle, the receptacle and the receptacle holder disposed between the motor case and the control unit case, wherein
   the motor case has a control-unit-side wall, which serves as a bottom end of the motor case, with an opening formed thereon,
   the control unit case has a cover part on a motor side of the control unit case, which serves as a bottom end of the control unit, with a connector opening formed thereon,
   the motor wire extending through the opening of the motor case and into the control unit case through the connector opening of the cover part,
   the fastener extends from within the control unit case and into the motor case via the opening of the control-unit-side wall and is attached to an outer portion of the motor case, and
   the receptacle and the receptacle holder extends through the cover part through the connector opening to mechanically couple the motor and the control unit and to electrically couple the motor wire and the connection terminal.

2. The drive unit of claim 1, wherein
   the receptacle has a base portion attached to an end portion of the motor wire that is disposed inside of the control unit and a tight end portion fastened to the connection terminal by a screw member.

3. The drive unit of claim 1, wherein the connection terminal is formed on a board that supports the switching element.

4. The drive unit of claim 2, wherein the receptacle holder is formed along an axial direction of the receptacle.

5. The drive unit of claim 2, wherein the receptacle holder is made with an insulation material.

6. The drive unit of claim 2, wherein the screw member couples the tight end portion of the receptacle from the control unit side to the motor side.

* * * * *